(No Model.)
D. G. FITZ-GERALD & A. H. HOUGH.
PORTABLE ELECTRIC LAMP.
No. 442,969. Patented Dec. 16, 1890.
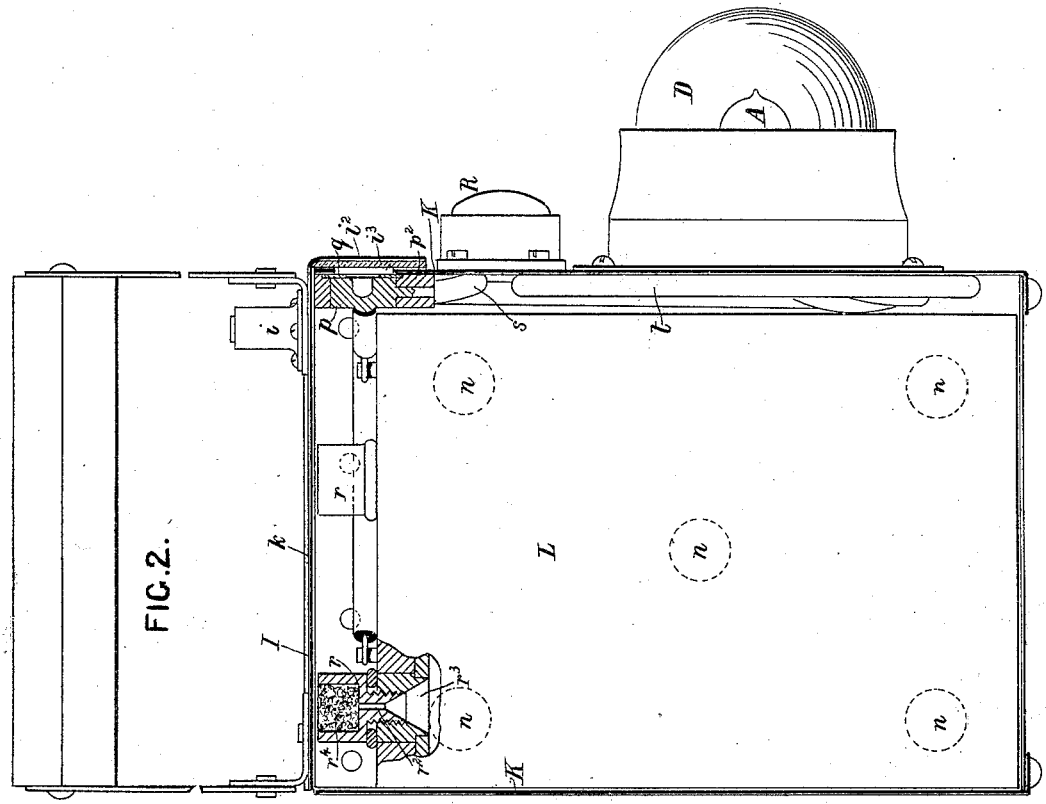
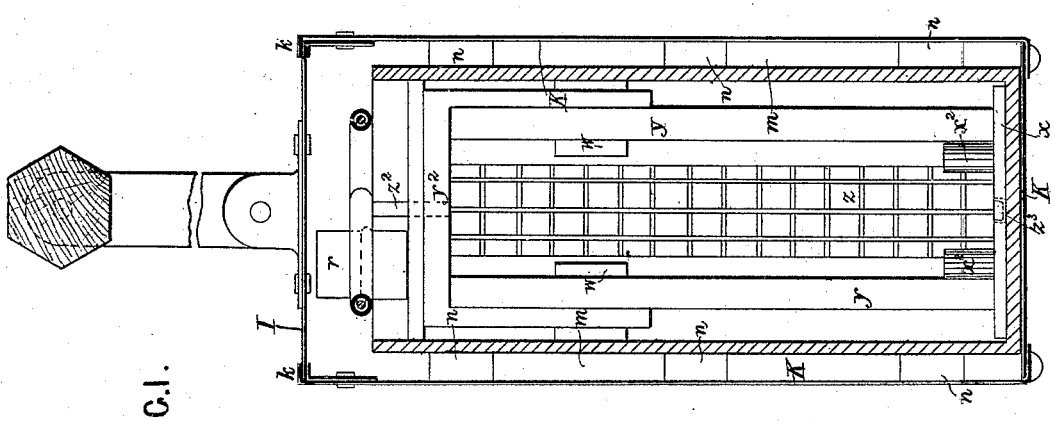
Witnesses:
Inventors:
Desmond G. Fitzgerald
Arthur H. Hough
by Marcellus Bailey
his Attorney

UNITED STATES PATENT OFFICE.

DESMOND GERALD FITZ GERALD AND ARTHUR HENRY HOUGH, OF LONDON, ENGLAND, ASSIGNORS TO THE MINING AND GENERAL ELECTRIC LAMP COMPANY, LIMITED, OF SAME PLACE.

PORTABLE ELECTRIC LAMP.

SPECIFICATION forming part of Letters Patent No. 442,969, dated December 16, 1890.

Application filed September 9, 1890. Serial No. 364,404. (No model.) Patented in England February 26, 1890, No. 3,094.

*To all whom it may concern:*

Be it known that we, DESMOND GERALD FITZ GERALD, electrician, and ARTHUR HENRY HOUGH, electrical engineer, subjects of the Queen of Great Britain and Ireland, and residing, respectively, at 46 Loughborough Road, Buxton, in the county of Surrey, England, and at 13 Lausanne Road, Peckham, in the county of Surrey, England, have invented certain Improvements in Portable Electric Lamps, more especially intended for miners' use, (for which we have applied for a patent in Great Britain, No. 3,094, dated February 26, 1890,) of which the following is a specification.

This invention has for its object to provide a portable electric lamp for miners' use or for other purposes, which lamp is strong and compact and more efficient and readily charged than are those as heretofore constructed.

We will refer to the accompanying drawing in explaining this invention, the said drawing representing longitudinal and transverse sections of a lamp made according to this invention.

According to this invention the casing K of the lamp is made of a strong material or metal, preferably steel, with a lead lining or coating to prevent its being injured by the electrolyte. To apply the lead to the steel, the surface of the steel is thoroughly cleaned and then it is heated and solder is applied, and then the casing is dipped in molten lead, or an alloy of lead may be used in place of the lead. The elements and electrolyte are contained in a vessel L, (constituting a cell or cells,) preferably of vulcanite or ebonite and of such a size as to leave a space $m$ between its outside and the inside of the casing K, and in this space india-rubber or other elastic or yielding material may be placed or secured, as indicated at $n$, so that the cell or cells and their contents are prevented from being injured by any blow which the casing K may receive. Only the sides or both the sides and the end opposite that at which the lamp proper is situated, or both ends, may be provided with the elastic arrangements described. The outer casing K is covered by a lid or cover I, preferably of the same material as the said casing and capable of being slid into and from its place in grooves or turned-down parts $k$ at the upper part of the casing K. This lid or cover I may be secured by a fastening, as at $i$, which may be similar to that used in the Meusler lamp. The cover I is provided with a depending piece $i^2$, lined with vulcanite, ebonite, or other insulating material $i^3$, which, when the cover is in place, covers and protects the charging contact-pieces, (one of which is shown at $p$,) which are preferably of lead. They are secured in the insulating material $p^2$ in the casing, as shown, and are in convenient position for being brought readily into electric contact with the leads from the appliance for charging the battery. The various connections from the battery to the lamp are preferably of lead insulated, and those from the switch to the contact-pieces $p$ are carried up through the insulating material $p^2$. Where the connections pass through the casing K and the said vulcanite or ebonite or other insulating material, the holes in the case, if the case be of metal, should be larger than the conductors, so as to prevent risk of short-circuiting with the metal of the casing, and for the same purpose where connections such as the contacts $p$ are near to the metal casing a piece of insulating material may be intervened, as at $q$.

R is a switch attached to the lamp-casing to break and complete the lamp-circuit and the charging-circuit, as desired.

The lamp-bulb A and its protecting-glass D may be of any suitable shape or description. The elements in the cell or cells may also be of any suitable kind. For instance, they may consist of a central cylinder $z$ of spongy lead and lithanode, which may be covered by a perforated sheet of celluloid or other non-conductor, the peroxide elements $y$ being carried by a bridge-piece $y^2$ of vulcanite, ebonite, or other insulating material passed onto a stem $z^2$, projecting from the central cylindrical element, a lower stem $z^3$ from which rests in an insulated footstep-piece $x$ in the bottom of the cell, or they may be of spongy lead in the form of a plate held by a support of copper; but, as before stated, we do not limit ourselves to any particular form or construction of elements. $x^2$ are projections of insulating material, and $w$ are disks constituting distance-pieces for keeping the electrodes properly separated. The connections from the charging-studs $p$ to the lamp A and battery, respectively, may be burned together, or they may be made by screwing the stem of the charging-studs and passing the ends of the connections over the screwed stem projecting inside the battery and then screwing a nut on the stem to clamp the connections. The openings through the top of the cell or cells for charging it or them with electrolyte and allowing of the escape of gas may consist of a cup or screw-piece $r$, passed through the top of the cell and having a perforation $r^2$, with an inward part $r^3$ of a conical form with the narrow end upward to prevent the exit of liquid but allow of the escape of gas. The cup part $r^4$ at top may contain a material such as cotton-wool. When the battery is to be charged, the switch R is turned so as to break the contact between the conductors $s\ t$, so that the circuit to the lamp from the battery is broken, the cover I is removed, and the lamp is placed on a stand, so that the contact-pieces $p$ come into contact with the terminals from the apparatus by which the storing-current is supplied.

Having now particularly described and ascertained the nature of the said invention and in what manner the same is to be performed, we declare that what we claim is—

1. In portable electric lamps, a vessel containing or constituting the cell or cells inclosed in an outer casing, between which casing and the said vessel is interposed elastic material, substantially as hereinbefore explained.

2. In a portable electric lamp, a vessel containing or constituting the cell or cells inclosed in an outer metal casing covered with lead or lead alloy or like protective coating, between which vessel and casing elastic material is interposed, substantially as set forth.

3. In portable electric lamps, the combination of a vessel, a vessel-casing, and elastic material interposed between said vessel and casing, with a cover or lid formed to protect the charging-contacts, substantially as described.

In testimony whereof we have signed our names to this specification in the presence of two subscribing witnesses.

DESMOND GERALD FITZ GERALD.
ARTHUR HENRY HOUGH.

Witnesses:
WILLIAM F. UPTON,
  47 *Lincoln's Inn Fields, London, W. C.*
S. C. TANSAR,
  *9 Birchin Lane, London.*